J. J. WITT.
TAILSTOCK FOR LATHES.
APPLICATION FILED OCT. 29, 1919.

1,369,152.

Patented Feb. 22, 1921.

Inventor
John J. Witt
By Attorneys
Southgate & Southgate

Witness
C. F. Nissen

UNITED STATES PATENT OFFICE.

JOHN J. WITT, OF WINCHENDON, MASSACHUSETTS, ASSIGNOR TO GOODSPEED MACHINE COMPANY, A CORPORATION OF MASSACHUSETTS.

TAILSTOCK FOR LATHES.

1,369,152.　　　　　　　Specification of Letters Patent.　　　Patented Feb. 22, 1921.

Application filed October 29, 1919.　Serial No. 334,224.

*To all whom it may concern:*

Be it known that I, JOHN J. WITT, a citizen of the United States, residing at Winchendon, in the county of Worcester and State of Massachusetts, have invented a new and useful Tailstock for Lathes, of which the following is a specification.

This invention relates to a tail stock for lathes and similar machines. While capable of general application it is particularly designed for wood-working lathes.

It is the object of the invention to provide means by which both the elevation and lateral position of the tail-center may be conveniently adjusted and by which the adjustments may be securely maintained.

With this object in view, one feature of my invention relates to the provision of a wedge supporting the bearing block for the tail-center, together with means for adjusting the wedge longitudinally. In the preferred form the block is also adjustable laterally to vary the lateral position of the tail-center.

My invention further relates to arrangements and combinations of parts hereinafter described, and more particularly pointed out in the appended claims.

A preferred form of my invention is shown in the drawings, in which—

Figure 1:
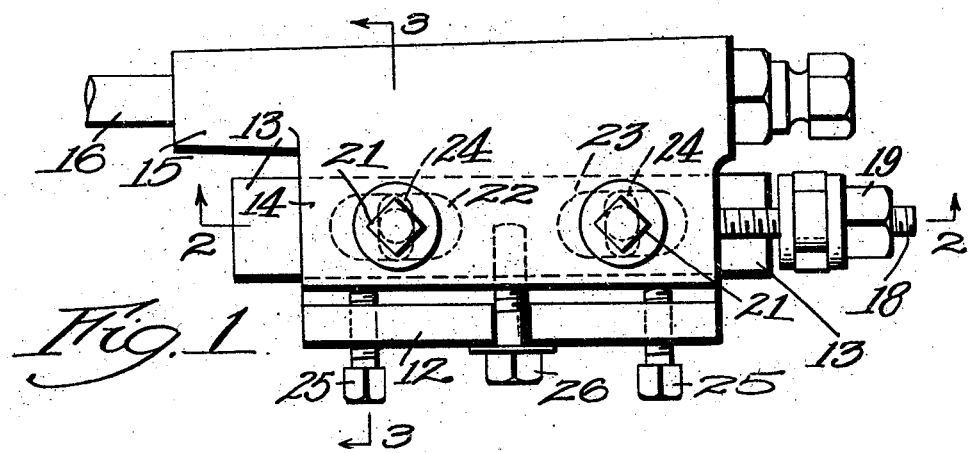
Figure 1 is a plan view of my improved tail-stock.

Referring to the drawings, I have indicated a portion of a base 10 which may be secured to the bed of the lathe in any usual or desired manner.

The upper portion of the base comprises an inclined supporting surface 11, and a vertical flange 12 on the front side of the base. The surface 11 is of substantial width and occupies the greater portion of the top of the base.

A wedge 13 is supported on the surface 11 and a bearing block 14 rests upon the upper surface of the wedge 13. The engaging surfaces of the base and the wedge are complementary, so that the upper surface of the wedge is horizontal or parallel to the bed of the machine.

Figure 3:
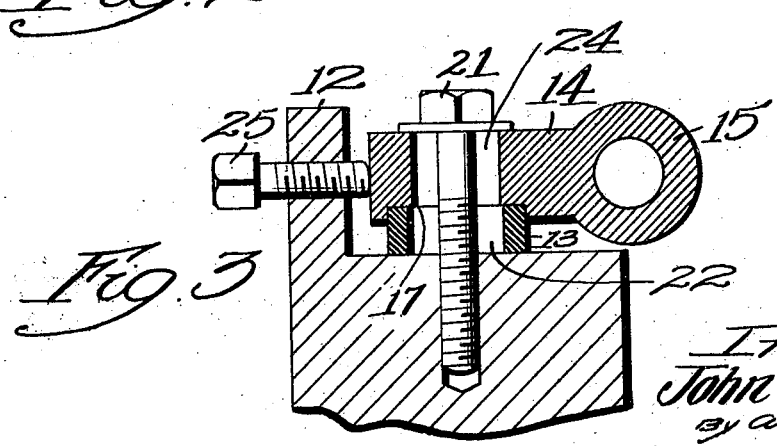
Fig. 3 is a partial sectional elevation taken along the line 3—3 in Fig. 1.

The bearing block 14 is provided with a bearing portion 15 in which the center 16 is mounted in the usual manner. Preferably the under surface of the bearing block is recessed, as shown at 17 in Fig. 3, to receive the upper portion of the wedge 13 which is slidable longitudinally in said recess but maintains a constant lateral relation to the bearing block.

A stud 18 is mounted in the block 14 and is provided with a grooved nut 19 fitting a forked extension 20 of the wedge 13. As the nut is turned on the fixed stud 18, the wedge is moved in one direction or the other relatively to the block 14.

Figure 2:
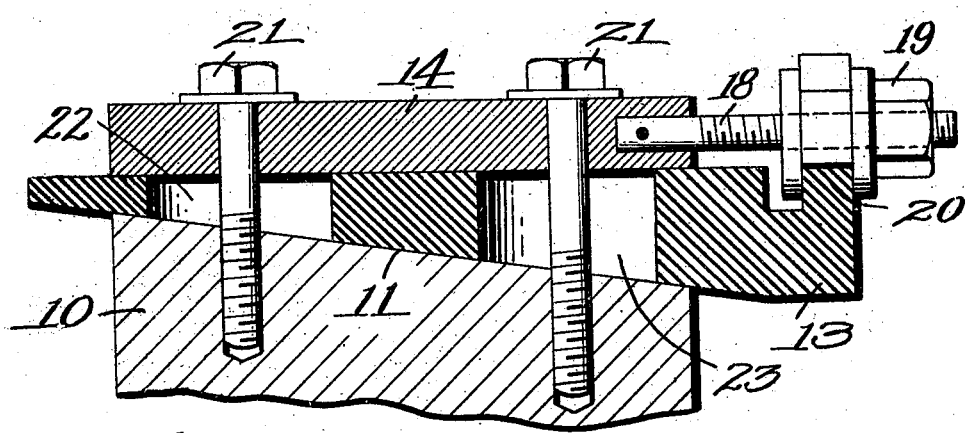
Fig. 2 is a longitudinal elevation taken along the line 2—2 of Fig. 1.

The block 14 is held in fixed adjusted position on the base 10 by binding screws 21, (Fig. 2). Large openings 22 and 23 are provided in the wedge 13 to receive the screws 21 and to permit relative adjustment of the wedge. The block 14 is also provided with slots 24 through which the screws 21 extend, thus permitting lateral adjustment of the block 14.

Such lateral adjustment is secured by means of set-screws 25—25 threaded in the vertical flange 12 of the base 10 and engaging the side of the block 14, together with a screw 26 extending through a vertical slot in the flange 12 and threaded in the block 14. The screw 26 serves to draw the block 14 firmly against the ends of the screws 25.

With this construction it will be seen that the bearing block may be adjusted laterally by the screws 25 and 26, and may be adjusted vertically by the nut 19 and wedge 13 and that when thus adjusted it may be securely held in position by the binding screws 21. The center 16 may thus be raised or lowered or moved laterally in either direction to any desired position while the base 10 remains in fixed position on the bed or other supporting structure.

Having thus described my invention, it will be evident that changes and modifications can be made therein by those skilled in the art within the spirit and scope of my invention as set forth in the claims, and I do not wish to be otherwise limited to the details herein disclosed, but what I claim is:—

1. A lathe tail-stock having, in combination, a base, a wedge supported thereon, a bearing block supported by said wedge, means to adjust said wedge longitudinally, additional means to adjust said bearing block laterally, and means to secure said parts in adjusted position.

2. A lathe tail-stock having, in combination, a base, a wedge supported thereon, and a bearing block supported by said wedge, said wedge being adjustable longitudinally, and said block and wedge being adjustable laterally as a unit.

3. A lathe tail-stock having, in combination, a base with an inclined upper surface, a wedge adjustable longitudinally and laterally on said base, a bearing block supported by said wedge, and means to prevent longitudinal movement of said block with said wedge but permitting lateral movement therewith.

In testimony whereof I have hereunto affixed my signature.

JOHN J. WITT.